RE 25500

Dec. 27, 1960     L. J. O'BRIEN     2,966,076
DIFFERENTIAL GEARING

Filed Feb. 4, 1960     3 Sheets-Sheet 1

*INVENTOR.*
LOREN J. O'BRIEN
BY Walter E. Pavlick

ATTORNEY

United States Patent Office 2,966,076
Patented Dec. 27, 1960

2,966,076

DIFFERENTIAL GEARING

Loren J. O'Brien, Grabill, Ind., assignor to Dana Corporation, Toledo, Ohio, a corporation of Virginia Filed Feb. 4, 1960, Ser. No. 6,779

3 Claims. (Cl. 74—711)

This invention relates to differential gearing and more particularly to limited slip differentials or semi-locking differentials wherein the compensating action of the gearing is retarded.

As is well known to motorists and to others skilled in the art, when one of the driving wheels of a motor vehicle loses traction and begins to spin, the other driving wheel remains stationary, if it has traction, and does not operate to move the vehicle. Because of this condition, a motor vehicle is completely immobilized if one of the driving wheels loses traction, as so frequently occurs when driving on wet, slippery or muddy surfaces.

To provide the best possible performance there should be at least a minimum amount of resistance torque available in the differential when one wheel is subject to very low resistance so that wheel slippage can be eliminated on low traction surfaces. In addition to this, it is desirable to provide a braking or resistance torque in the differential which is variable in proportion to the amount of differential input torque being transmitted to the axles.

Many prior art constructions have been provided in an attempt to satisfactorily incorporate the above features. Generally, these prior constructions have utilized the axial thrust of the differential side gears to load a friction clutch or braking means. Resilient means in the form of coil springs has been provided between the side gears to bias the side gears outwardly to provide a minimum load on the friction clutch or braking means. However, this minimum bias has adversely affected the normal operation and backlash of the side gears. Furthermore, the mounting of the coil springs between the side gears has subjected the springs to forces which have caused excessive failures due to buckling.

Prior constructions, such as Wildhaber Patent No. 1,750,981, have also utilized a minimum bias on a differential to retard differentiation, the bias being independent of the side gears; however, such constructions have not provided means for increasing the retarding effect.

Therefore, an object of this invention is to provide a minimum retarding action independent of the side gears which retarding action is increased by axial thrust of the side gears upon increase of input torque.

Another object of this invention is to utilize an independent spring thrust and the axial thrust of the differential side gears to provide a simple and self-adjusting braking means on the differential action to control slippage at varying load conditions, at the same time allowing differentiation for turning.

A still further object of this invention is to provide a differential which is of simple construction, being composed of a minimum of parts, which are not only easy to fabricate and install but also very economical to manufacture.

In the preferred embodiment of this invention, a power transmission gear train is operatively disposed within a gear case. Resilient means independent of the gear train and the gear case biases a clutch means to oppose relative rotative movement of members of the gear train. The gears of the gear train are meshed in a relationship to provide a component of tooth pressure for urging gears of the gear train axially outward to increase the loading of the clutch means in proportion to the input torque to the transmission.

These and other objects and advantages of this invention will become apparent from the following detailed description when taken in connection with the accompanying drawings wherein.

Figure 1:
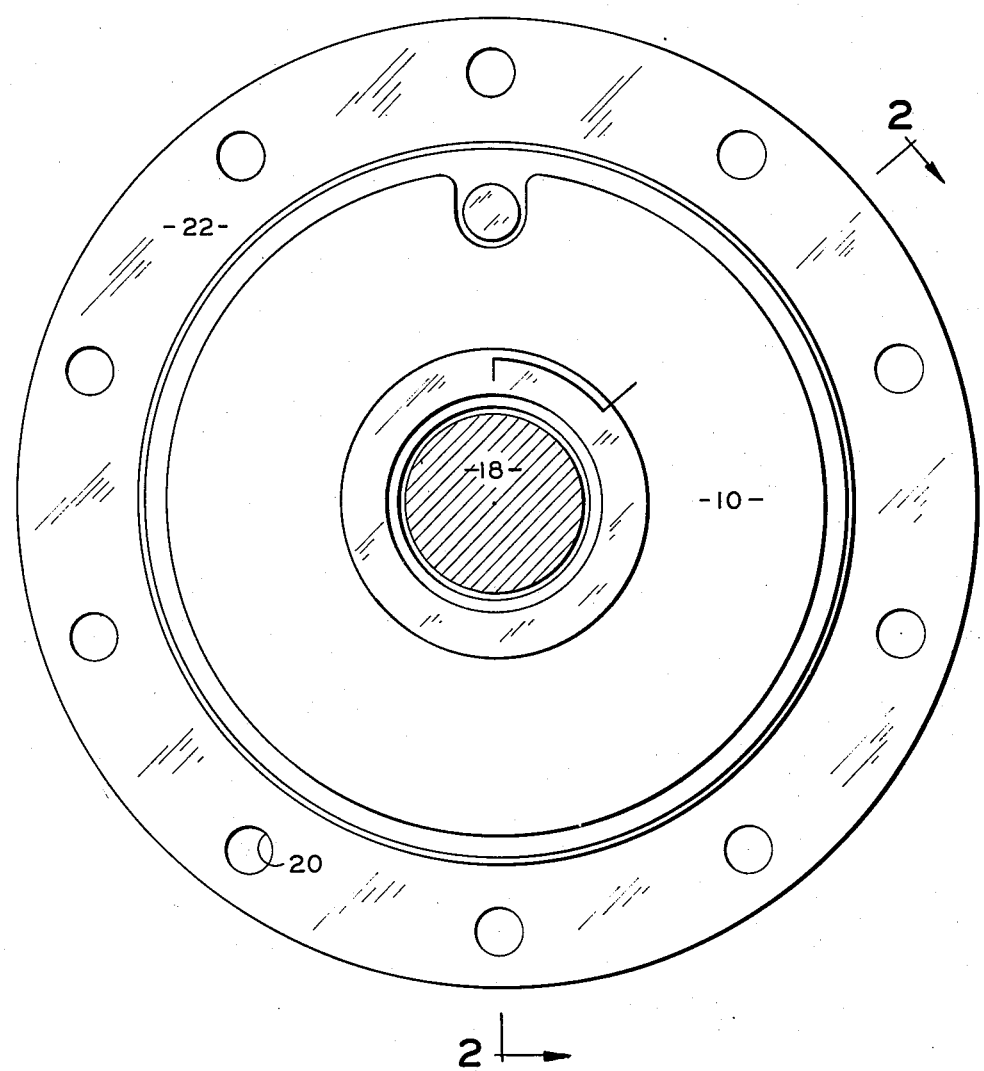
Fig. 1 is an end elevation view of the differential embodying this invention.
Figure 2:
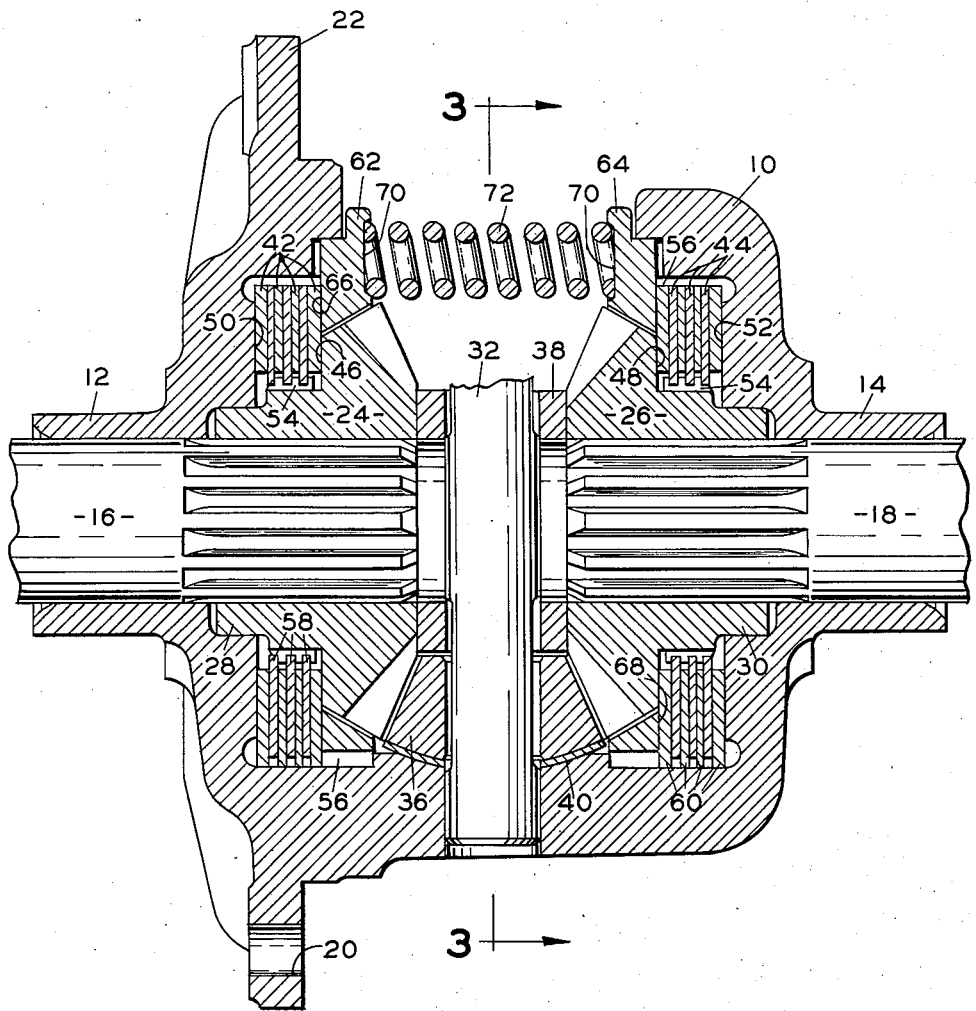
Fig. 2 is a sectional view taken on line 2—2 of Fig. 1.
Figure 3:
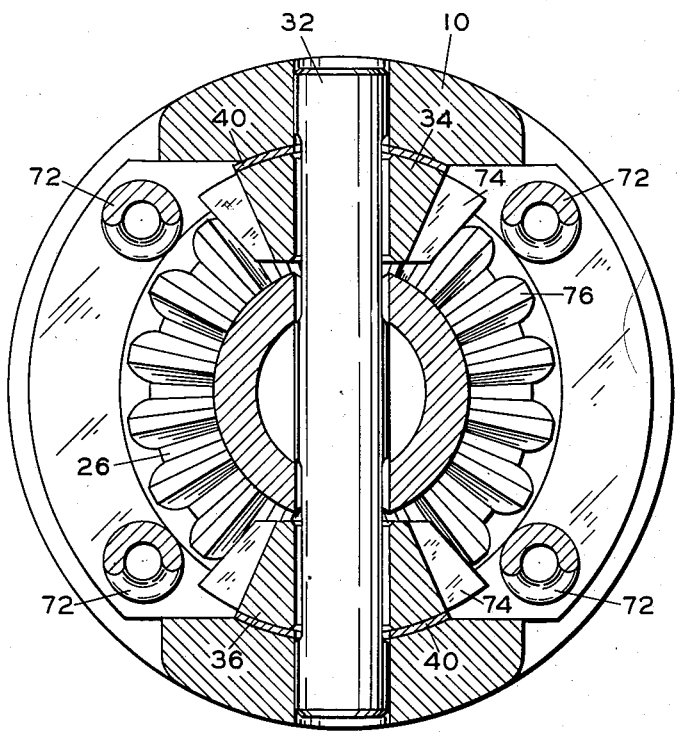
Fig. 3 is a partial sectional view taken on lines 3—3 of Fig. 2.

Referring more particularly to the drawings a casing 10 is provided with opposed hubs 12, 14 extending outwardly from the ends thereof. Axle shafts 16, 18 have their adjacent or inner ends projecting in rotatable relation into the hubs 12 and 14. The axle shafts 16, 18 at their outer ends are connected to the driving wheels of a vehicle equipped with this invention. A conventional ring gear (not shown) is attached by means of bolts which are secured through apertures 20 to a circumferential flange 22 of the case 10 for the reception of the power drive from a propeller shaft (not shown). As is very well known, the case 10 is enclosed in the conventional manner within a differential housing (not shown), which carries the usual supply of lubricant for the differential.

Positioned within the case 10 are axially aligned side gears 24 and 26 arranged in spaced apart facing relation. The side gears 24 and 26 are provided with hubs 28 and 30 extending outwardly and splined to receive mating splines of the axle shafts 16 and 18.

Extending diametrically through the case 10 and centrally between the side gears 24 and 26 is a spider member or pin 32. The spider member 32 is of elongated cylindrical configuration and carries compensating or pinion gears 34 and 36 adjacent its ends. A spacer block 38 of annular configuration is disposed centrally on the spider member 32 and is engaged by the opposed side gears 24 and 26. The compensating gears 34 and 36 intermesh with the side gears 24 and 26 and are held in spaced apart relation on the spider 32 by the bearing block 38. It is now apparent that the bearing block 38 prevents inward movement of the side gears 24 and 26 to eliminate possible bottoming of the teeth thereof with the compensating gears 34 and 36. Thrust washers 40 of suitable bearing material are inset in the casing 10 and having a contour conforming to the outer facing of the pinion or compensating gears 34 and 36 to limit outward thrust thereof upon rotation of the gears.

Clutch means is disposed between each side gear 24 and 26 and the case 10 to retard relative rotative movement of the gears and thus retard the compensating action. The clutch means takes the form of sets of interleaved friction plates or discs 42 and 44 interposed between surfaces 46 and 48 of the side gears 24 and 26, respectively, and the opposing side walls 50 and 52 of the casing 10. More specifically, the hub of each side gear is formed with external spur gear teeth 54, and the casing 10 is provided with internal annular spur gear teeth 56 opposed to and concentric with each set of spur gear teeth 54. Each of the friction plates 44 is formed with internal spur gear teeth 58 interlocked with spur gear teeth 54 of the contiguous side gear. Each friction plate 42 is provided with external gear teeth 60 interlocked with the contiguous internal annular gear teeth 56 of the case. While the friction plates 42 and 44 are mounted for rotation with the side gears and the case respectively, it is readily apparent that the discs are slidable in an axial direction.

To maintain a predetermined preload or bias on the clutch means, a pair of truncated annular pressure plates 62 and 64 are positioned within the case 10 in spaced relationship. The pressure plates are arranged concentrically with the side gears 24 and 26 and each has an inner rim portion 66, 68 engageable with the clutch means. Each of the pressure plates 62 and 64 is also provided with a plurality, four in this instance, of opposed cup shaped notches 70. Coil springs 72 are seated in the opposed notches 70 and urge the pressure plates 62, 64 axially outward to compress the friction plates 42 and 44 against the surfaces 50 and 52 of the case. The coil springs 72 are disposed intermediate the compensating gears 34 and 36 and, being positioned outside the side gears 24 and 26, exert a force outwardly toward the case completely independent of the gears of the power transmission gear train. Hence, it is apparent that no interference exists on the mesh between the side gears and the compensating gears.

To increase the frictional resistance to compensating action of the differential in proportion to the input torque thereto, the angle of the pitch cone of the compensating or pinion gears 34 and 36 is less than that of the side gears 24, 26 and owing to the abnormally large pressure angles of the gear teeth 74 and 76 of the compensating gears and side gears, the side gears which are larger than the compensating gears and hence have a greater brake surface, tend to move axially outward during rotation of the gears.

The friction between the discs 42 and 44 is not sufficient to lock the side gears 24 and 26 to the case 10 under normal operating torques but is sufficient to retard relative rotation of the gears and thus reduce the compensating action.

From the foregoing it is apparent that a differential transmission has been provided wherein an initial bias or preload independent of the side gears of the differential resists differential action and upon increase of the input torque to the differential the side gears thereof are moved axially outwardly by the positive pressure angled teeth of the side and compensating gears to increase the resistance to differential action.

While only a single embodiment of this invention has been shown and described, it is apparent that there may be many changes in structure as well as operation without departing from the scope of this invention as defined by the appended claims.

I claim:

1. In a differential transmission unit the combination comprising a gear case, a power transmission gear train positioned within said case, clutch means for opposing relative rotative movement of members of said gear train, and resilient means independent of said gear train and said case for loading said clutch means, the gears of said gear train being meshed in a relationship to provide a component of tooth pressure for urging at least one gear of said gear train axially outward to increase the loading of said clutch means in proportion to input torque to the transmission.

2. In a differential transmission unit the combination comprising a rotatable gear case, a power transmission gear train operatively positioned within said case, and clutch means operatively disposed between said gear train and said gear case for opposing relative rotative movement of members of said gear train, said clutch means including a pair of friction surfaces at least one of which is associated with said gear train for rotation therewith and another of which is associated with said gear case for rotation therewith, and resilient means independent of said gear train and said gear case for causing engagement of said friction surfaces, the gears of said gear train being meshed in a relationship to provide a component of tooth pressure for urging at least one gear of said gear train axially outward to increase the force applied to said friction surfaces in proportion to input torque to the transmission.

3. In a differential transmission unit, the combination comprising a rotatable gear case, a power transmission gear train operatively positioned within said case and including a pair of side gears, clutch means operatively disposed between each of said side gears and said case for opposing relative rotative movement of members of said gear train, said clutch means comprising at least a pair of cooperating friction surfaces, and resilient means independent of said side gears and said case for loading said friction surfaces, the gears of said gear train having positive pressure angled teeth biasing said side gears axially outward to increase the loading of said frictional surfaces and resist differential action by an amount proportional to the input torque.

4. In a differential transmission unit, the combination comprising a rotatable gear case, a power transmission gear train operatively positioned within said case and including a compensating gear and a pair of side gears intermeshing therewith, clutch means operatively disposed between each of said side gears and said gear case for opposing relative rotative movement of members of said gear train, said clutch means including at least a pair of cooperating friction surfaces, and resilient means independent of said side gears applying a force on said friction surfaces acting outwardly toward said case for loading said friction surfaces, the compensating gear and the side gears being meshed in a relationship to provide a component of tooth pressure for urging said side gears axially outward to increase the force applied to said friction surfaces in proportion to input torque to the transmission.

5. In a differential transmission unit the combination comprising a rotatable gear case, a power transmission gear train operatively positioned within said case and including a plurality of compensating gears and side gears, clutch means operatively disposed between each of said side gears and said gear case for opposing relative rotative movement of members of said gear train, said clutch means including a plurality of interleaved friction plates, some of which are secured to said side gear train for rotation therewith and others of which are secured to gear case for rotation therewith, and spring means independent of said gear train biasing said interleaved friction plates axially outward against said case, the pitch line of said side and compensating gears being disposed at an angle to utilize the axial thrust of the meshing teeth of said gears to supplement said spring means and increase the force applied to said friction plates in proportion to the torque input to the transmission.

6. In a differential transmission unit the combination comprising a rotatable gear case, a power transmission gear train operatively positioned within said case and including compensating gears and side gears, clutch means operatively disposed between each of said side gears and said gear case for opposing relative rotative movement of members of said gear train, said clutch means including at least a pair of cooperating friction surfaces, a pair of pressure plates movably mounted in said casing each adapted to load said friction surfaces, and spring means independent of said side gears and compressed between said pressure plates for applying a force to said friction surfaces, the pinion gears and side gears being meshed in a relationship to provide a component of tooth pressure for urging said side gears axially outward to increase the force applied to said friction surfaces in proportion to input torque to the transmission.

7. In a differential transmission unit the combination comprising a rotatable gear case, a power transmission gear train operatively positioned within said case and including compensating gears and side gears, said side gears being adapted for receiving axle shafts and each having a plurality of friction plates axially movable thereon, axially shiftable friction plates interleaved with the friction plates of each side gear and mounted in said case to rotate therewith, a pair of pressure plates axially movable in said casing and each adapted to engage said friction plates, and resilient means independent of said side gears compressed between said pressure plates for biasing the friction plates against said case to oppose relative rotative movement of members of said gear train, the pitch line of said side and compensating gears being disposed at an angle to utilize the axial thrust of the meshing teeth of said gears to supplement said resilient means to increase the force applied to said friction surfaces in proportion to the input torque to the transmission.

8. In a differential transmission unit, the combination comprising a rotatable gear case, a power transmission gear train operatively positioned within said case and including a pair of opposed side gears each adapted for connection to an axle shaft, a plurality of friction plates positioned between each of said side gears and said case, some of said friction plates being rotatable with and axially movable relative to each side gear, and other of said friction plates being rotatable with and axially movable in said case, a pair of pressure plates axially shiftable within said case and each adapted to engage the friction plates between one side gear and the case, and resilient means independent of said side gears compressed between said pressure plates and biasing the friction plates against said casing to oppose relative movement of members of said gear train, the members of said gear train having positive pressure angled intermeshing teeth for moving said side gears axially outwardly into engagement with said friction plates to increase the loading thereof and resist differential action by an amount proportional to the input torque.

No references cited.